United States Patent
Lago et al.

(10) Patent No.: US 10,266,049 B2
(45) Date of Patent: Apr. 23, 2019

(54) ANTI-SIPHONING DEVICE, PARTICULARLY FOR PREVENTING THE EXTRACTION OF FUEL FROM TANKS

(71) Applicant: LAGO ACCESSORI S.R.L., Fontaniva (IT)

(72) Inventors: Fabio Lago, Cittadella (IT); Giovanni Lago, Fontaniva (IT)

(73) Assignee: LAGO ACCESSORI S.R.L., Fontaniva (IT)

( * ) Notice: Subject to any disclaimer, the term of this patent is extended or adjusted under 35 U.S.C. 154(b) by 73 days.

(21) Appl. No.: 15/323,909

(22) PCT Filed: Jul. 1, 2015

(86) PCT No.: PCT/EP2015/065039
§ 371 (c)(1),
(2) Date: Jan. 4, 2017

(87) PCT Pub. No.: WO2016/001330
PCT Pub. Date: Jan. 7, 2016

(65) Prior Publication Data
US 2017/0151868 A1    Jun. 1, 2017

(30) Foreign Application Priority Data
Jul. 4, 2014   (IT) ............... TV2014A0097

(51) Int. Cl.
*B60K 15/04*   (2006.01)

(52) U.S. Cl.
CPC ............... *B60K 15/0403* (2013.01)

(58) Field of Classification Search
CPC ............... B60K 15/0403; B60K 15/04; B60K 2015/0344
(Continued)

(56) References Cited

U.S. PATENT DOCUMENTS 3,951,297 A * 4/1976 Martin ............... B60K 15/0403
220/86.3
7,721,902 B2 * 5/2010 Grote ................. B60K 15/0403
220/86.3
(Continued)

FOREIGN PATENT DOCUMENTS

EP   2165873 A1   3/2010
FR   2852893 A3   10/2004
(Continued)

OTHER PUBLICATIONS

International Search Report dated Aug. 26, 2015 re: Application No. PCT/EP2015/8065039; pp. 1-4; citing: WO 2014/028500 A2, GB 2 476 954 A, EP 2 165 873 A1, WO 2007/110640 A1, FR 2 877 277 A1 and FR 2 852 893 A3.
(Continued)

*Primary Examiner* — Shawn M Braden
(74) *Attorney, Agent, or Firm* — Cantor Colburn LLP (57) ABSTRACT

An anti-siphoning device, particularly for preventing the extraction of fuel from tanks, the anti-siphoning device includes a ring provided with an axial tube and with which an additional ring is associable which is coupled to the tank. The device further includes the first end of a duct which protrudes within the tank associated rotatably with the axial tube and is provided, axially and at the second end, with an ogive which is adapted to guide and direct the flow of the fuel according to a fluid stream. Elements are further provided for spacing apart the ogive from the inner lateral surface of the duct.

9 Claims, 6 Drawing Sheets

(58) Field of Classification Search
USPC ........................................................ 220/86.3
See application file for complete search history.

(56) References Cited

U.S. PATENT DOCUMENTS

| | | | |
|---|---|---|---|
| 8,122,909 B2* | 2/2012 | Tonkovich ............ | B01F 5/0611 |
| | | | 137/833 |
| 8,746,480 B2* | 6/2014 | Wholey ............. | B60K 15/0403 |
| | | | 141/286 |
| 2012/0298213 A1* | 11/2012 | Forster ............... | B60K 15/0403 |
| | | | 137/215 |

FOREIGN PATENT DOCUMENTS

| | | |
|---|---|---|
| FR | 2877277 A1 | 5/2006 |
| GB | 2476954 A | 7/2011 |
| WO | 2007110640 A1 | 10/2007 |
| WO | 2014028500 A2 | 2/2014 |

OTHER PUBLICATIONS

Written Opinion dated Aug. 26, 2015 re: Application No. PCT/EP2015/8065039; pp. 1-5; citing: WO 2014/028500 A2, GB 2 476 954 A, EP 2 165 873 A1, WO 2007/110640 A1, FR 2 877 277 A1 and FR 2 852 893 A3.

* cited by examiner

ANTI-SIPHONING DEVICE, PARTICULARLY FOR PREVENTING THE EXTRACTION OF FUEL FROM TANKS

TECHNICAL FIELD

The present disclosure relates to an anti-siphoning device, particularly for preventing the extraction of fuel from tanks.

BACKGROUND

Nowadays it is known to provide tanks for motor vehicles which are substantially constituted by very capacious containers into which the insertion of the fuel is done by way of an adapted inlet.

Such tanks are usually arranged below the loading surface of the vehicle, at preset heights both from the ground and from the chassis, in a sheltered area, usually in the space between the axles of two wheels.

Conventional tanks suffer a number of problems. First of all their great capacity has entailed the provision of nozzles for pumps for dispensing fuel which have a high flow-rate, since they necessarily have to dispense as much as hundreds of liters per minute in order to fill such tanks.

Such nozzles have standardized dimensions for the dispensing duct, which must be placed with the end tip in abutment in the inlet, and must then dispense the fuel at high speed. This entails the necessity that the dispensing duct must be positioned correctly in the inlet, usually at right angles to it in order to prevent one or more drawbacks from occurring, which include: splashing and backing-up owing to cross-sections which are of insufficient capacity for the flow-rate of the dispensing nozzle, or arrest of the flow of fuel from the nozzle owing to the automatic shut-off thereof.

Such method of positioning creates problems when the distance between the loading surface of the vehicle/trailer and the inlet is lower than the overall height that the nozzle has to assume in the condition in which the dispensing duct is correctly positioned in the inlet.

This entails the necessity to position the nozzle incorrectly, with consequent non-optimal positioning in axial alignment of the dispensing duct in the inlet and consequent non-optimal dispensing of the fuel, given that it does not flow axially to the inlet, and with an increase in the total time required to carry out the complete delivery.

Furthermore, in conventional tanks there is the problem of preventing the drawing-off for example of Diesel fuel; thus solutions of the mechanical type are known, in which it is sought substantially to reduce to the minimum the cross-section of entry to the tank in order to obstruct the introduction into it of flexible tubes for extracting the fuel.

In such conventional solutions, it is sought to prevent access to the tank using a tube, which is arranged between the entry point of the refueling inlet and the inside of the tank proper, and which contains a perforated metallic net or a "cobweb" of baffles, which are arranged on multiple levels and mutually offset.

These solutions, which therefore consist substantially of using a mechanical obstruction, although they provide a sufficient level of barring, also make it difficult to get liquid into the tank, for example Diesel fuel, when refueling, given that the Diesel fuel is forced to be deviated and turned back in several directions, in a chaotic manner and not in the direction of flow, thus forcing the person carrying out the refueling to choke the flow of fuel, increasing the time necessary to conclude the filling of the tank, so as to avert the sudden release of the nozzle by the intervention of the safety valve of the nozzle, and the interruption of the flow.

Furthermore if the barrier system against extracting Diesel fuel is arranged on the bottom of the tube of the anti-siphoning device fitted on the tank, such tube will be submerged completely once the tank has been filled with fuel.

In this case, once the cap of the tank is unscrewed, it is possible to easily extract the Diesel fuel comprised between the surface of the liquid and the bottom of the tube.

Considering that some tanks have a very large footprint in plan view, which generates capacities of as much as 1000 liters, it is easy to see that a few centimeters of Diesel fuel multiplied by the horizontal surface of the fuel contained in the tank translates to many dozens of liters of fuel that can be easily removed.

A further problem is constituted by the necessity to connect the anti-siphoning device fitted with the obstruction to the mouth of the tank; the conventional coupling systems involve either the use of metallic elements to be deformed, such as, for example, metallic tongues, or perforation and riveting of an anti-theft ring onto the tank body.

All such conventional systems require operations of greater or lesser length and special equipment, and they still allow ill-intended individuals, properly equipped, to remove the device.

SUMMARY

The principal aim of the present disclosure is therefore to resolve the above mentioned technical problems, while eliminating the drawbacks in conventional systems, by providing a device for tanks which makes it possible to prevent the theft of fuel from the tanks and at the same time to achieve an optimal and rapid dispensing of fuel and which at the same time defends the fuel contained in the tank from the sights of ill-intended individuals provided with means adapted to siphon off the contents of the tank.

Within this aim, the disclosure provides a device for preventing the drawing-off of fuel from the tank in the condition where the tank is full.

The disclosure also provides a device that makes it possible to prevent the theft of fuel while at the same time enabling an optimal and rapid dispensing of fuel when inserting the nozzle of the pump of the filling station.

The disclosure also provides a device that is structurally simple and is low cost.

These advantages which will become better apparent hereinafter, are achieved by providing an anti-siphoning device, particularly for preventing the extraction of fuel from tanks, which comprises a second ring which is provided with an axial tube and with which a third ring is associable which can be coupled to said tank, characterized in that the first end of a duct which protrudes within said tank is associated rotatably with said axial tube and is provided, axially and at the second end, with an ogive which is adapted to guide and direct the flow of the fuel according to a fluid stream, means being provided for spacing apart said ogive from the inner lateral surface of said duct.

BRIEF DESCRIPTION OF THE DRAWINGS

Further characteristics and advantages of the disclosure will become better apparent from the detailed description of a particular, but not exclusive, embodiment, which is illustrated by way of non-limiting example in the accompanying drawings wherein.

DETAILED DESCRIPTION OF THE DRAWINGS

In the embodiments illustrated, individual characteristics shown in relation to specific examples may in reality be interchanged with other, different characteristics, existing in other embodiments.

With reference to FIGS. 1-11, the reference numeral 1 generally designates a anti-siphoning device, particularly for preventing the extraction of fuel from tanks 2 of vehicles of the type with a vertical or oblique connector.

Figure 9:
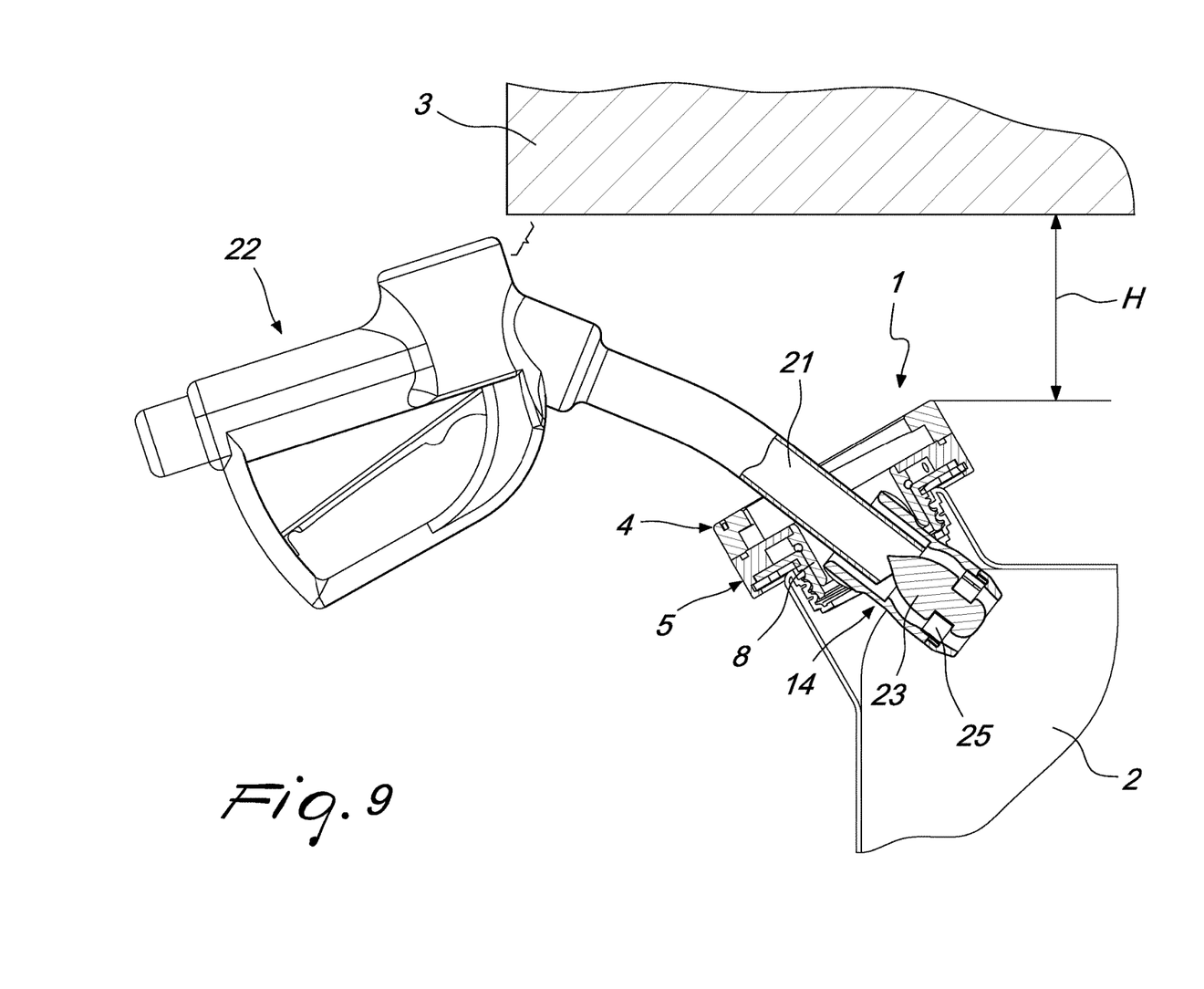
FIGS. 9 and 10 show the device with the nozzle inserted in two different configurations for the tank.
Figure 10:
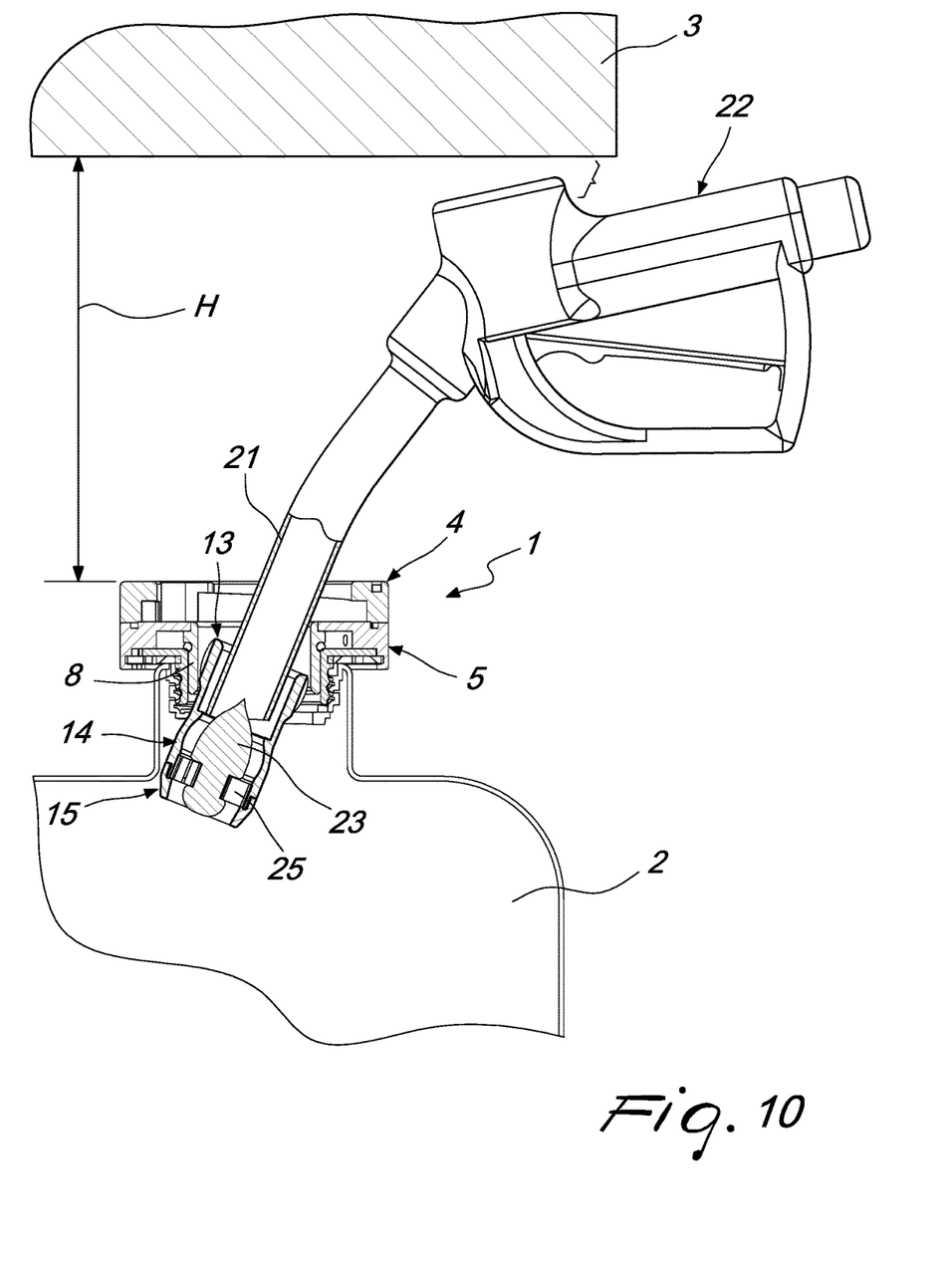

Usually the tanks 2 are positioned below the loading surface 3 of the vehicle at a preset distance H from the device 1 which is further positioned inward with respect to the overlying loading surface 3, for its better protection.

The device 1 comprises a first ring 4, which is usually used as an interconnection element with a cap. In the specific embodiment shown, this is annular and is perforated axially; it is associated, or rendered integral so as to constitute a single element, with an underlying second ring 5, which is substantially T-shaped, perforated axially and provided with a first head 6 from the perimetric rim of which a wall 7 and an axial tube 8 protrude, on the opposite side with respect to the first ring 4.

The first ring 4 may be substituted by a cap or by a valve or by any other means adapted to close the entry port of the device 1.

A T-shaped third ring 9 is associated with the second ring 5 and comprises thus a second head 10 which can be associated, for example by screwing or by fixing in a bayonet-like manner, internally with the wall 7, and a stem 11 which is provided externally with means for fixing to the inlet of a tank, such as for example a threading or a bayonet, and which is arranged concentrically and externally to the axial tube 8.

The stem 11 can be externally shaped according to the desired type of tank inlet for which it will be designed.

The third ring 9 is kept associated with the second ring 5 by way of a retaining ring or "C-clip" 12 in elastic steel.

The set of the first ring 4, second ring 5 and third ring 9 can thus be coupled to the tank 2.

Concentrically to and inside the axial tube 8, the first end 13 of a duct 14, which protrudes with its second end 15 within the tank 2, can be arranged and associated rotatably.

The duct 14 is substantially cylindrical and a plurality of axial slots 16, which are adapted to allow the venting of the air from the tank 2, are provided at the outer lateral surface of the first end 13.

At the first end 13 of the duct 14 there is, along the same transverse axis, a pair of first holes 17a, 17b.

At the end tip of the axial tube 8 there is, along the same transverse axis, a pair of second holes 18a, 18b.

Once the duct 14 has been positioned with respect to the axial tube 8, the pair of first and second holes 7a, 17b, 18a, 18b are mutually axially aligned so as to allow the placement of a pair of pivots 19a, 19b which allow the rotatable connection of the duct 14 to the axial tube 8.

Figure 1:
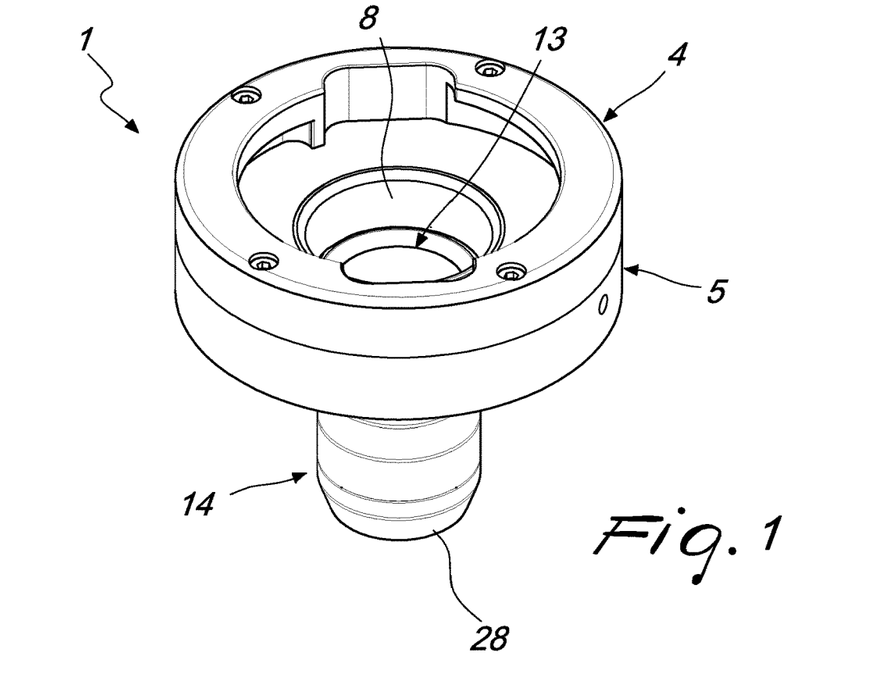
FIG. 1 is a perspective side view of the device according to the disclosure.
Figure 2:
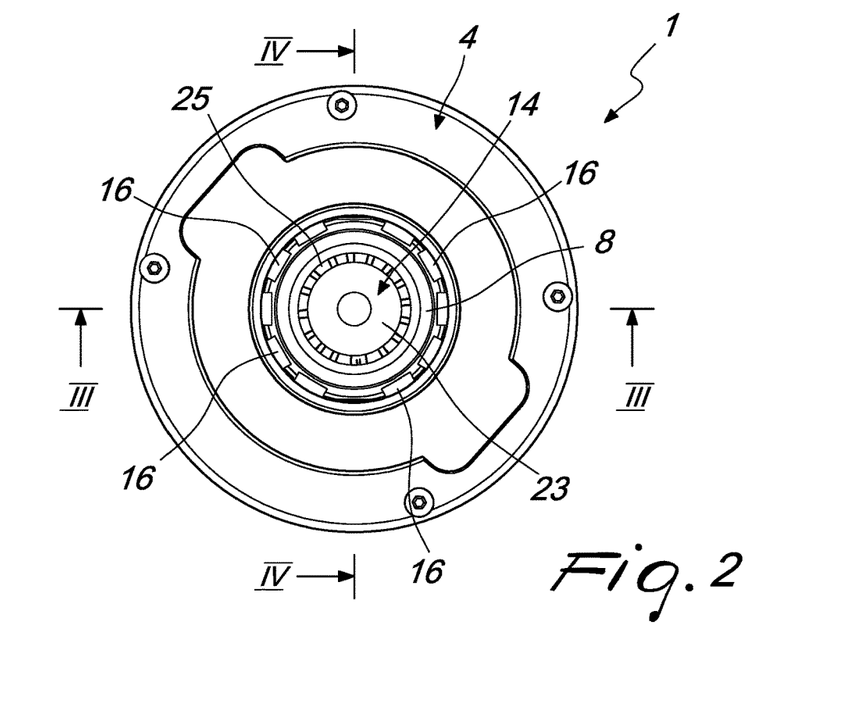
FIG. 2 is a view from above of the device with the ogive in axial alignment with the duct.
Figure 3:
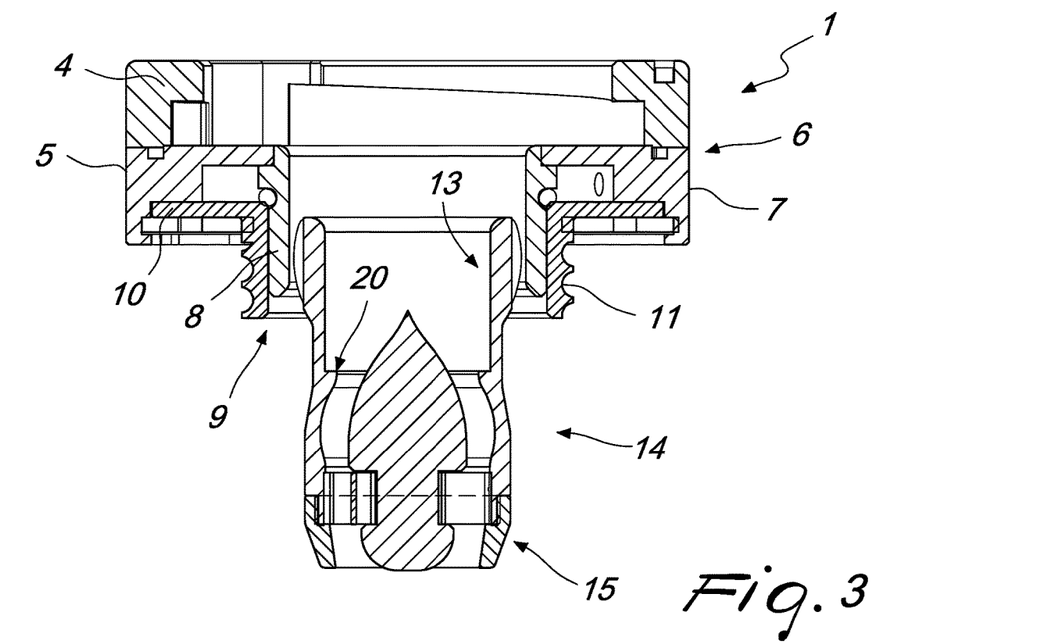
FIG. 3 is a sectional view of the device taken along the line in FIG. 2.
Figure 4:
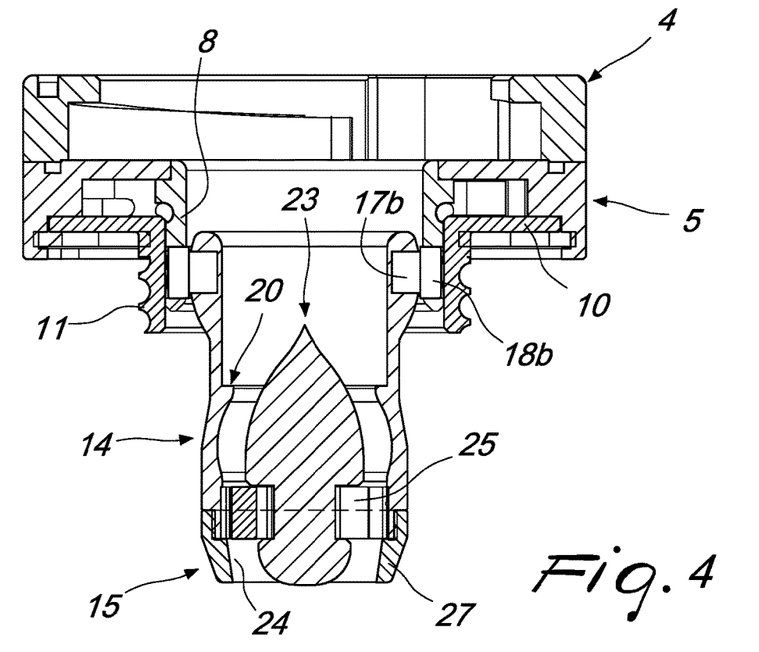
FIG. 4 is a sectional view of the device taken along the line IV-IV in FIG. 2.
Figures 5, 6, 7:
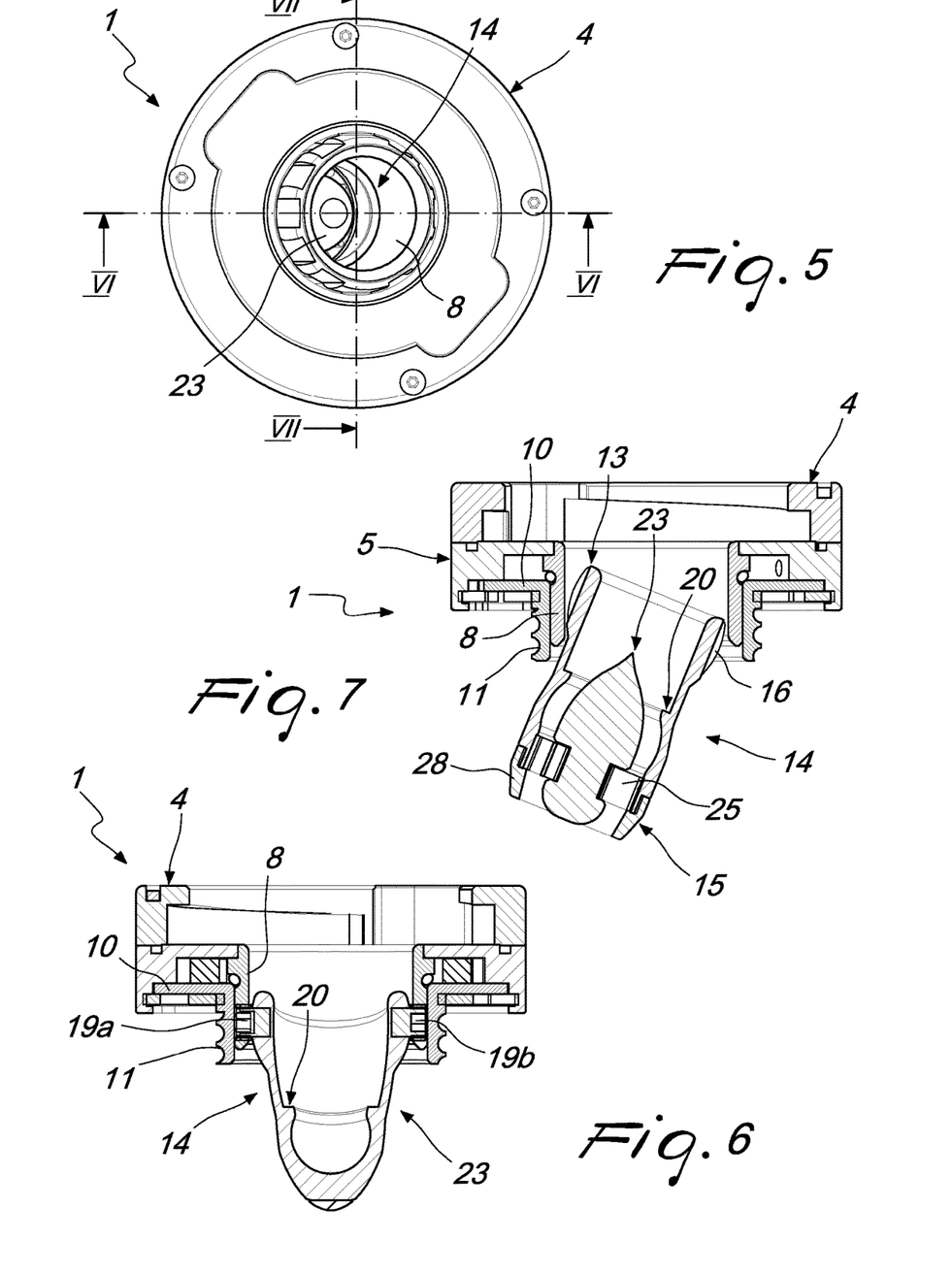
FIG. 5 is a view from above of the device with the duct rotated with respect to the assembly of rings.
FIGS. 6 and 7 are sectional views of the device respectively taken along the lines VI-VI and VII-VII in FIG. 5.
Figures 8, 11:
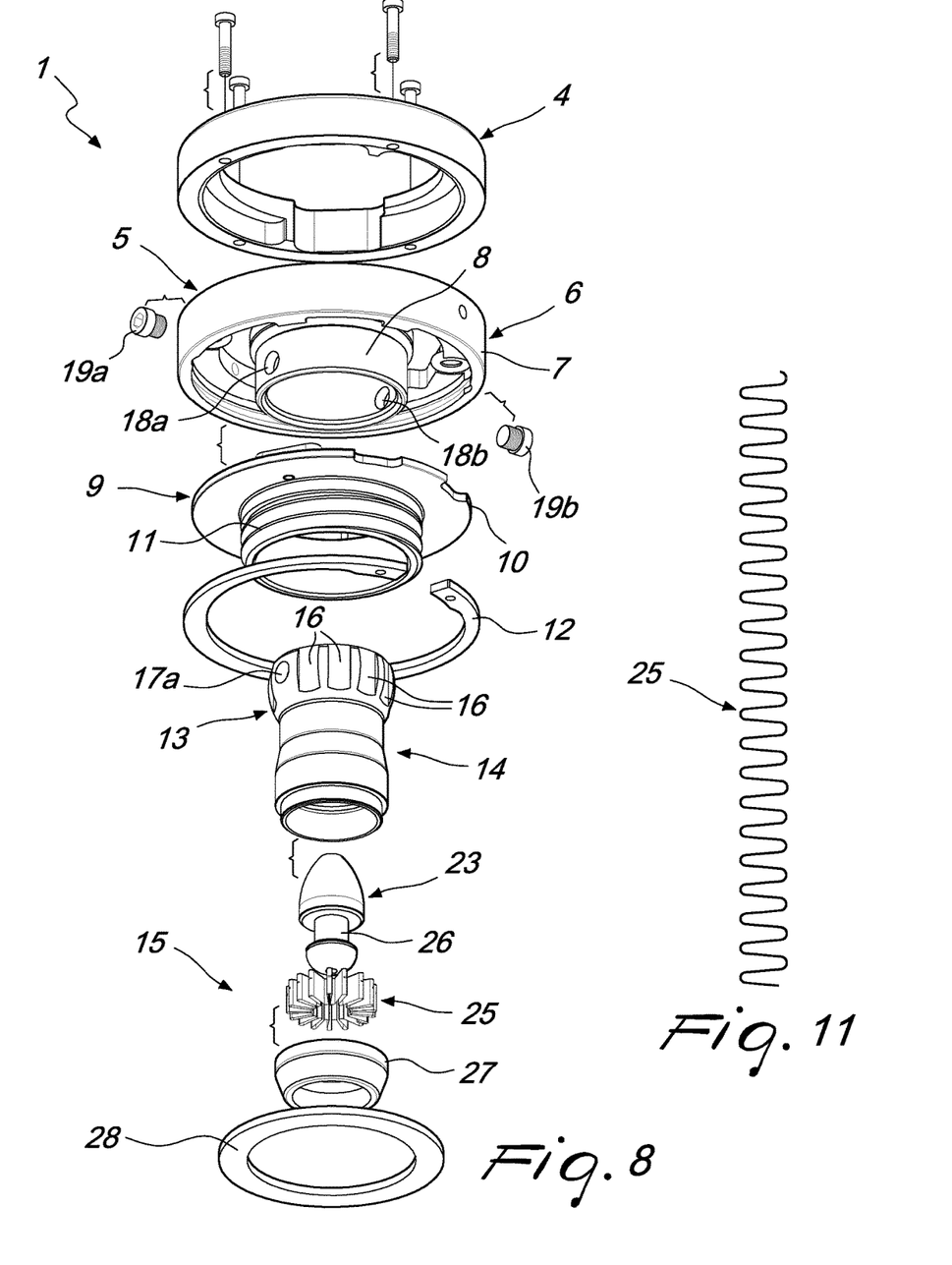
FIG. 8 is an exploded view of the device.
FIG. 11 shows the spring in an extended condition.

The duct 14 can thus oscillate with respect to the axial tube 8, as illustrated in FIG. 6, by a desired angle.

Inside the duct 14 there is, between the first and second ends 13, 15, a step 20 which constitutes an abutment for the end of the dispensing duct 21 of a nozzle 22 once it is arranged inside the device 1.

In particular, the maximum angle of inclination entails the possibility, once the dispensing duct 21 of the nozzle 22 has been inserted in the device 1, that the dispensing duct 21 be arranged in abutment on the step 20, the duct 14 and the dispensing duct 21 remaining substantially mutually axially aligned.

An ogive 23 is associated inside the second end 15 of the duct 14 and is adapted to guide and direct the flow of the fuel according to a fluid stream.

To this end the cross-section of the inner lateral surface of the second end 15 of the duct 14 is slightly curved.

The ogive 23 is provided in a downward region with means which are adapted to space the ogive 23 apart from the inner lateral surface 24 of the duct 14 and which are adapted to prevent the insertion of tubes to draw fuel; the means are constituted by a flat spring 25 which is folded in a zigzag arrangement and is then wound at an annular slot 26 which is provided in a downward region with respect to the ogive 23 and abuts against the inner lateral surface 24.

Advantageously, in order to allow the maintenance of the spring 25 if desired, the second end 15 of the duct 14 is detachably associable with a dome 27 for supporting and containing the spring 25.

Finally, a gasket 28 can be associated coaxially with the stem 11 of the third ring 9.

Use of the disclosure is thus the following: when the dispensing duct 21 of the nozzle 22 is inserted in the device 1, a condition of axial alignment can be maintained between the dispensing duct 21 and the duct 14 with the latter arranged in abutment on the step 20, and this in order to enable an optimal dispensing of the fuel.

Thanks to the inclination that the duct 14 can assume with respect to the first ring 4, second ring 5 and third ring 9, such optimal positioning is achieved even if the height H between the loading surface 3 and the device 1 is lower than the height of the nozzle 22 once inserted in the device 1.

Thus it has been found that the disclosure fully achieves the intended advantages by providing a device which makes it possible both to achieve an optimal and rapid dispensing of fuel and at the same time to prevent the drawing-off of fuel from the tank even in the condition where the tank is full.

The disclosure is susceptible of numerous modifications and variations.

Obviously, the materials used as well as the dimensions of the individual components of the disclosure may be more pertinent according to specific requirements.

The various means of achieving certain different functions certainly need not coexist only in the embodiment shown, but may be present in many embodiments, even if they are not shown.

The characteristics indicated above as advantageous, convenient or the like, may also be missing or be substituted by equivalent characteristics.

The invention claimed is:

1. An anti-siphoning device comprising a first ring, and a second ring, the second ring being provided with an axial tube and with which a third ring is associable and coupled to a tank, wherein a first end of a duct protrudes within the tank is associated rotatably with said axial tube and is provided, axially and at a second end, with an ogive adapted to guide and direct the flow of fuel according to a fluid stream, means being provided for spacing apart said ogive from an inner lateral surface of said duct.

2. The device according to claim 1, wherein the first ring is annular and perforated axially and is associated with said second ring, or rendered integral so as to constitute a single element, which is substantially T-shaped, perforated axially, and provided with a first head from the perimetric rim of which a wall and said axial tube protrude, on the opposite side with respect to said first ring, said third ring, which is T-shaped, being associated with said second ring and comprising a second head associated internally with said wall and an externally threaded stem arranged concentrically and externally to said axial tube, wherein the first end of a duct protrudes with its second end within the tank is arranged and is associated rotatably inside said axial tube.

3. The device according to claim 1, wherein said duct is substantially cylindrical and in that at an outer lateral surface of said first end there is a plurality of axial slots adapted to allow the venting of the air from the tank, at said first end there being, along the same transverse axis, a pair of first holes, at the end of said axial tube there being a pair of second holes provided along the same transverse axis.

4. The device according to claim 3, wherein once said duct has been positioned with respect to said axial tube, said pair of first holes and second holes are mutually axially aligned so as to allow placement of a pair of pivots which allow the free and rotatable connection of said duct to said axial tube.

5. The device according to claim 1, wherein inside said duct there is, between said first and second ends, a step which constitutes an abutment for the end of a dispensing duct of a nozzle once it is arranged inside said device.

6. The device according to claim 5, wherein a maximum angle of inclination of said duct entails the possibility, once said dispensing duct of said nozzle has been inserted in said device, that said dispensing duct is arranged in abutment on said step, said duct and said dispensing duct remaining substantially mutually axially aligned.

7. The device according to claim 1, wherein the ogive is associated inside said second end of said duct and adapted to guide and direct the flow of fuel according to a fluid stream, a cross-section of said inner lateral surface of said second end being slightly curved.

8. The device according to claim 1, wherein said ogive is provided in a lower region with means adapted to space the ogive apart from the inner lateral surface of said duct and are adapted to prevent the insertion of tubes to draw fuel, said means being constituted by a flat spring folded in a zigzag arrangement and is then wound at an annular slot provided in a lower region with respect to said ogive and abuts against said inner lateral surface.

9. The device according to claim 8, wherein a supporting and containment dome for said spring is detachably associable with said second end of said duct and in that a gasket is associated coaxially with said stem of said third ring.

* * * * *